United States Patent
Shambeau et al.

[11] Patent Number: 5,997,067
[45] Date of Patent: Dec. 7, 1999

[54] TAILGATE SUPPORT AND LATCH

[75] Inventors: Thomas Allan Shambeau, Beaver Dam, Wis.; Loren Fredrick Hansen, Lincoln, Nebr.

[73] Assignee: Deere & Company, Moline, Ill.

[21] Appl. No.: 09/292,419

[22] Filed: Apr. 15, 1999

[51] Int. Cl.$^6$ .................................................. B62D 33/03
[52] U.S. Cl. ...................... 296/57.1; 296/14; 296/26.03; 296/26.15; 296/36; 292/DIG. 17; 292/DIG. 29
[58] Field of Search ............................ 296/50, 57.1, 60, 296/59, 58, 36, 10, 14, 7, 26.03, 26.15, 26.11, 26.08, 26.09, 26.1, 61; 49/503, 394, 213, 222; 292/DIG. 17, 269, 273, DIG. 29; 16/357, 361, 363

[56] References Cited

U.S. PATENT DOCUMENTS

| | | | |
|---|---|---|---|
| D. 311,856 | 11/1990 | Tousaw | D8/331 |
| 2,278,450 | 4/1942 | Jones | 296/24.1 |
| 4,348,045 | 9/1982 | Hori et al. | 296/14 |
| 5,280,986 | 1/1994 | Friesen et al. | 296/57.1 |
| 5,752,636 | 5/1998 | Manley | 224/405 |

FOREIGN PATENT DOCUMENTS

| | | | |
|---|---|---|---|
| 3305345 | 9/1984 | Germany | 296/36 |
| 0020225 | 2/1978 | Japan | 296/36 |

OTHER PUBLICATIONS

John Deere, 1800 Utility Vehicle brochure, 3 pages, published Jan. 1998 in U.S.A.
Kawasaki Motors Corp, Mule Accessories Catalog, 8 pages, publication date unknown, published in U.S.A.
John Deere, Military Gator Utility Vehicle brochure, 2 pages, published Mar. 1998 in U.S.A.
John Deere, Gator Utility Vehicles brochure, 8 pages, published Jan. 1998 in U.S.A.
Yanmar brochure, 4 pages, publication date and country unknown.
Daihatsu America, Inc., Hijet Multipurpose Off–Road Utility Vehicle Daihatsu, publication date and country unknown.

*Primary Examiner*—Joseph D. Pape
*Assistant Examiner*—Patricia Engle

[57] ABSTRACT

A tailgate support is provided for a cargo box having a floor, opposite sidewalls and a rear wall with the latter being defined by a tailgate which is mounted for pivoting about a horizontal axis located adjacent the floor, between an upright closed position and a recumbent open position. The tailgate support includes an arm mounted beneath the floor and movable between a stored position wherein the arm is disposed beneath the floor and a support position wherein the arm extends beyond the floor in a direction of horizontal extension of the tailgate as considered when the tailgate is in its open position. The tailgate rests on the arm when the arm is in its support position and the tailgate is in its open position. A latching mechanism is provided to secure the tailgate in its open position. A stop is provided to limit the pivotal movement of the arm beyond its stored and support positions.

11 Claims, 8 Drawing Sheets

TAILGATE SUPPORT AND LATCH

BACKGROUND OF THE INVENTION

1. Field of the Invention

The present invention relates to utility hauling vehicles and more particularly relates to latches and supports for tailgates on cargo boxes of such vehicles.

2. Description of Related Art

Various hauling vehicle designs are known which include a cargo box having sidewalls and a tailgate which forms a rear wall thereof, the tailgate being mounted for pivoting about a horizontal axis at its bottom end between raised closed and lowered open positions.

Typically, a latch is provided at each upper corner of the tailgate for retaining the tailgate in its closed position and a flexible element, such as a cable, is provided which extends between each upper corner and the upper rear portion of each sidewall of the box for retaining the tailgate in an open position wherein it forms a horizontal extension of the bed or floor of the box.

These known tailgate latches and supports include many parts which, in most cases are either not designed or are not tight enough to keep the tailgate from rattling while the vehicle is operated with the tailgate open. For example, flexible cables suspend the tailgate but don't provide support against upward pivoting. Therefore, the tailgate (and cargo resting on the tailgate) may flop up and down as the vehicle travels across uneven terrain.

At least one such utility vehicle has sidewalls which also may be pivoted about a horizontal axis. Such a utility vehicle may be used, for example, to carry miscellaneous cargo or to transport injured and/or sick individuals from an off-road site to an ambulance or medical treatment facility.

Where the sidewalls are also pivotable to horizontal positions, however, cables may not be used in a conventional manner to support a tailgate because there is not an upright structure adjacent to the tailgate from which the tailgate can be suspended. One utility vehicle having sidewalls and a tailgate pivotable to transform the cargo box into an extended flat bed includes a complex system of pins, slots and slides used to hold the tailgate and sidewalls in a generally horizontal position. Such a system represents a relatively large cost to manufacture and maintain. Also, conversions from cargo box to flat bed, and vice versa, require substantial time and effort. In addition, the sliding movement of components requires a relatively precise alignment between parts. The relative sliding encourages wear of painted surfaces, which promotes rust. Dents in components or a moderate amount of dirt and debris may further hinder efficient operation.

SUMMARY OF THE INVENTION

It is therefore an object of the invention is to provide a cargo box having a tailgate latch and support assembly which overcomes the disadvantages of the prior art structures.

It is another object of the invention to provide a tailgate latch and support assembly which eliminates structure extending above the floor of the cargo box when the tailgate is its open position.

A further object of the invention is to provide a tailgate latch and support assembly which will function well in dirty environments.

According to the invention these and other objects are attained by providing a tailgate support for a cargo box comprised of a floor, opposite sidewalls and a pivotable tailgate. The tailgate support is configured as an arm mounted beneath the floor and movable between a stored position wherein the swing arm is disposed substantially beneath the floor and a support position wherein the arm extends beyond the floor in a direction of horizontal extension of the tailgate when the tailgate is opened. The open tailgate is supported on the arm when the arm is in its support position.

In a preferred embodiment, the tailgate support is configured as a pivotable swing arm which includes a latch for securing the tailgate to the support it its open position. In addition, a stop is provided for the tailgate support at its stored and support positions so that the support may be easily stored unobtrusively while complementary structures on the tailgate and the tailgate support may be easily aligned for latching.

DESCRIPTION OF THE EXEMPLARY EMBODIMENT

Figure 1:
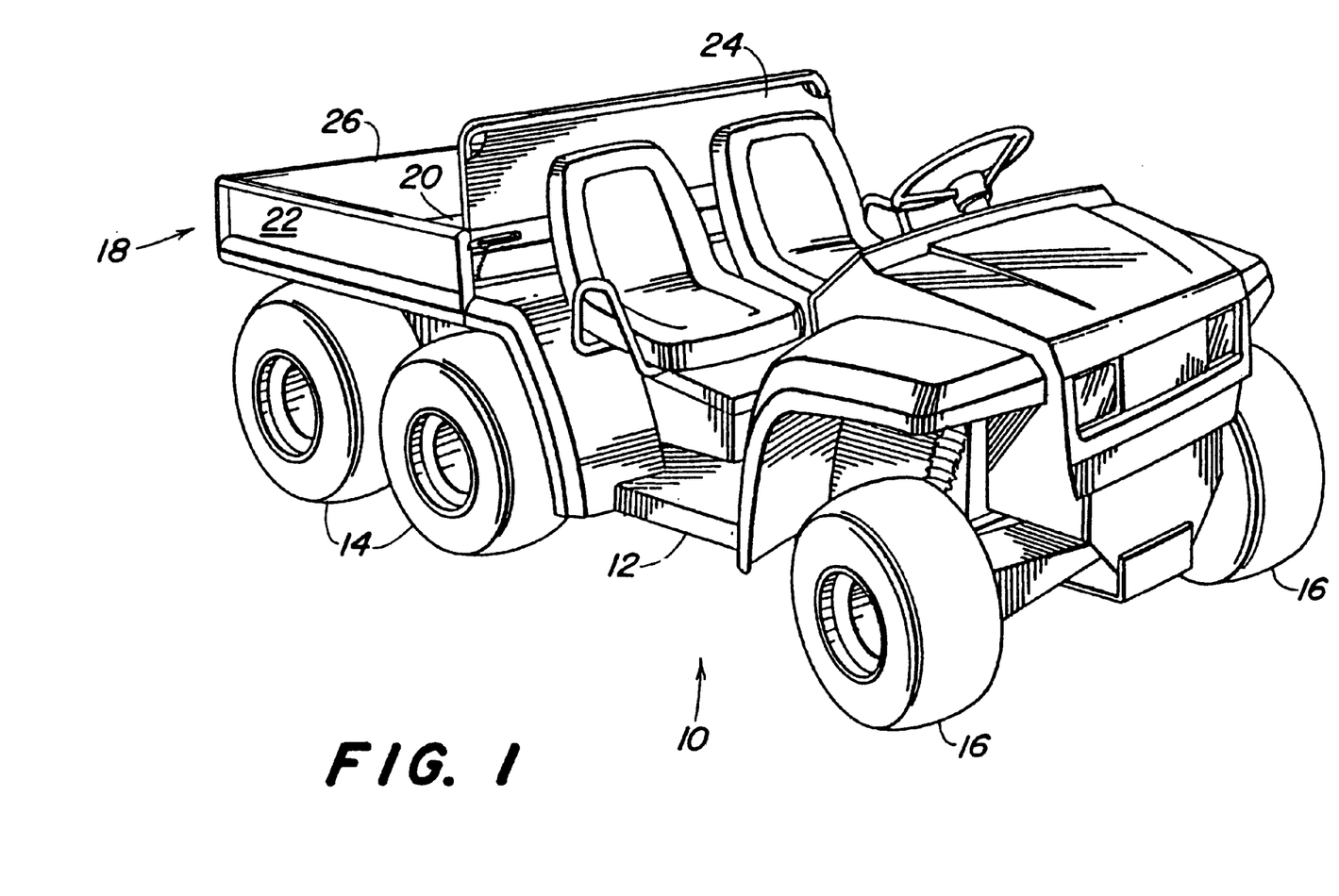
FIG. 1 is a right front perspective view of a utility hauling vehicle of the type with which the present invention is particularly adapted for use.

FIG. 1 shows a utility hauling vehicle 10 including a frame 12 supported by four drive wheels 14 (two of which are shown in FIG. 1) and a pair of steerable front wheels 16. Supported on the frame 12 in a location above the drive wheels 14 is a cargo box 18. The box 18 includes a horizontal bed or floor 20 and vertical right and left sidewalls 22, a front wall 24 and a tailgate 26. The tailgate 26 forms a rear wall of the box 18 and is mounted, in a manner to be described, for selectively closing the opening defined by the rear edges of the floor 20 the sidewalls 22. The sidewalls 22 are also mounted, in a manner to be described, for pivoting about fore and aft extending horizontal axes. In this manner, the sidewalls 22 and the tailgate 26 may be pivoted from closed, upright positions to open, recumbent positions wherein they effectively become extensions of the floor 20 and the cargo box 18 may be thereby converted to a flat bed (as may be seen in FIG. 3).

Figure 2:
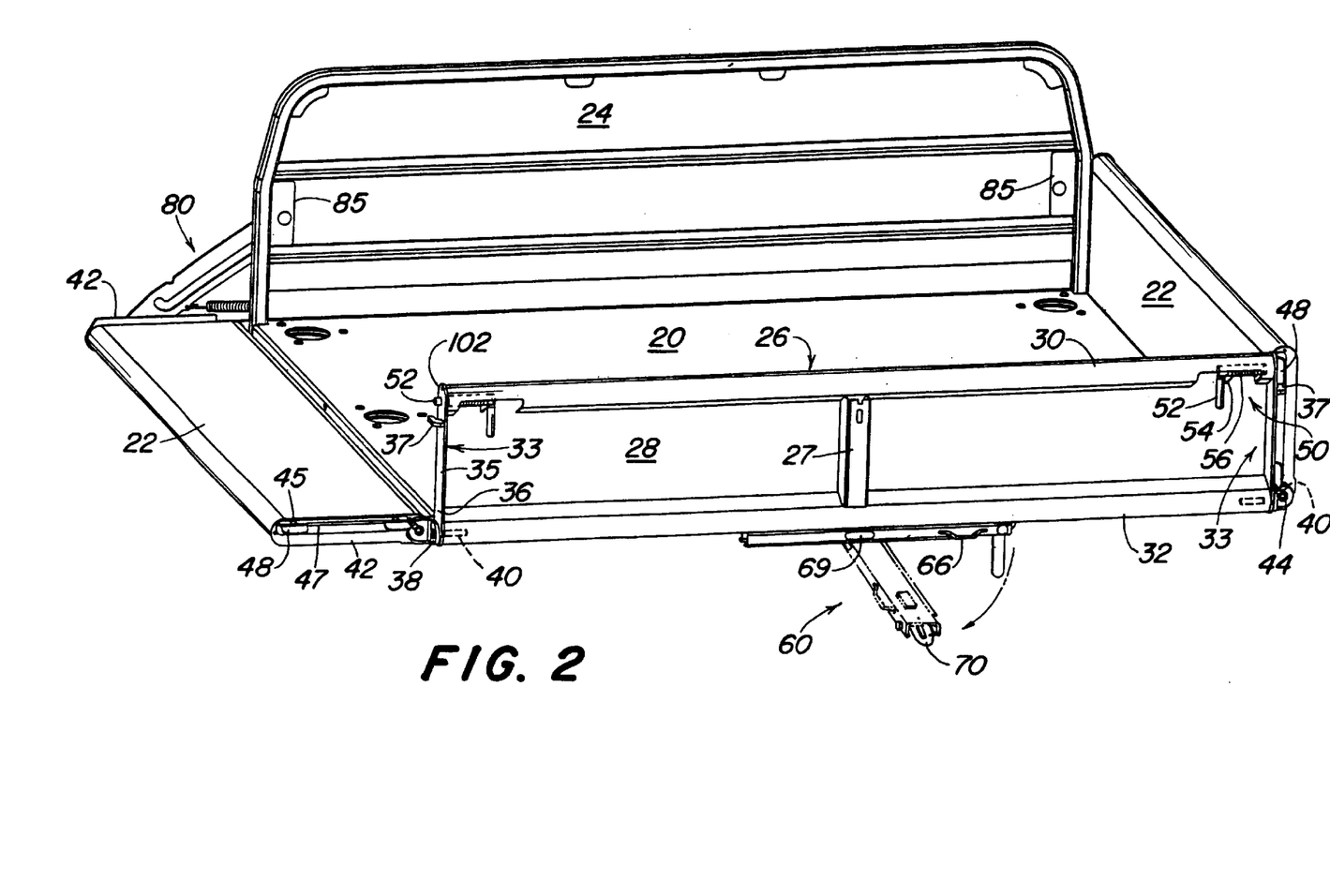
FIG. 2 is a left rear perspective view of the cargo box of the utility vehicle of FIG. 1 wherein one of the sidewalls is shown in its open, recumbent position.

Referring now to FIG. 2, the tailgate 26 as considered in its upright position includes an upright panel 28 having a rolled upper edge 30 and a rolled bottom edge 32. A latch section 27 in the form of an open-ended U-channel is welded to the upright panel 28. Opposite ends 33 of the tailgate 26 are each defined by a tailgate end plate 35 having a main straight portion 36 and a sidewall retaining tab 37. A tailgate bracket 38 is fixed to the floor 20 and receives a pivot pin 40, which further extends through a hole in the tailgate end plate 35. The pivot pin 40 is retained by threaded engagement with a nut welded to an interior side of the end plate 35 and abutment of the head of the pivot pin 40 with the bracket 38. The pivot pins 40 at each end of the tailgate 26 represent a generally horizontal axis about which the tailgate 26 may pivot. The tailgate 26 also includes a latching structure 50 at each end 33 including an L-shaped rod 52, which is guided for axial movement by confinement within a hole in a bracket 54 fixed to and extending rearwardly from the upright panel 28, a bushing welded to the inside of the end plate 35 and an aligned hole in the tailgate end plate 35. A spring 56 is captured between the bracket 54 and a pin extending through a crossbore in the rod 52 such that the rod 52 is biased towards a position wherein an end of the rod 52 extends outwardly beyond the tailgate end plate 35.

Figure 3:
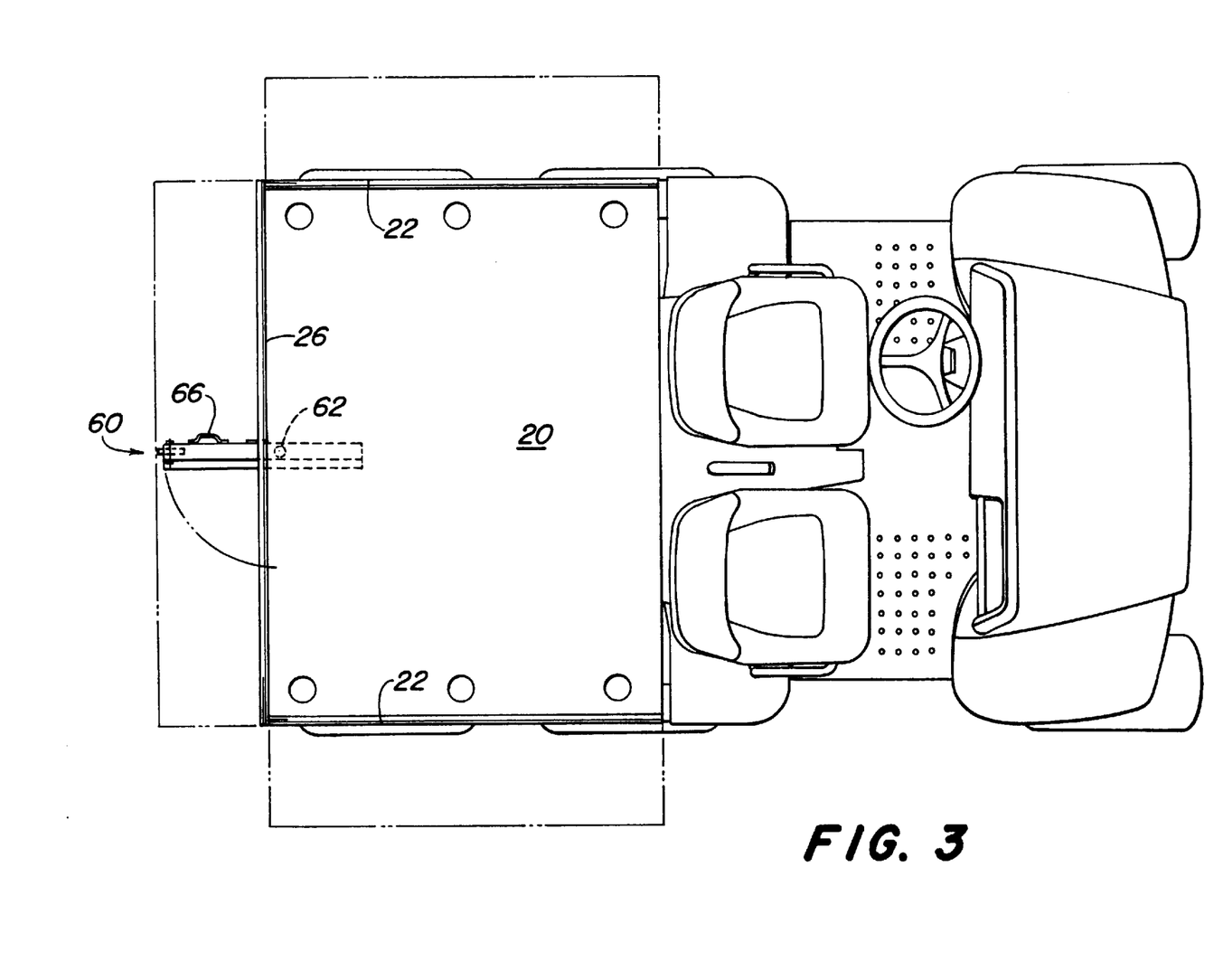
FIG. 3 is a plan view of the utility vehicle of FIG. 1 showing the sidewalls and tailgate in solid lines in their closed, upright positions and showing the sidewalls and tailgate in phantom lines in their open, recumbent positions.

As shown in FIGS. 2–6, A swing arm 60 is mounted to the frame 12 of the vehicle 10 under the floor 20. The swing arm 60 is fixed to the frame by a bolt 62 at a bracket 63 so that the swing arm 60 may pivot about a generally vertical axis between a stored position wherein the swing arm 60 extends laterally and is disposed beneath the floor 20, and a support position wherein the swing arm 60 extends longitudinally and a latching section 64 extends rearwardly past the tailgate 26 as considered in its closed position. FIG. 3 shows the swing arm 60 in its support position and the relative positions of the tailgate 26 and sidewalls 22 in their closed and open (represented by dashed lines) positions. Preferably, the swing arm 60 is provided with a handle 66 which an operator may grasp to rotate the swing arm 60 between its stored and support positions The bracket 63 includes a rotation stop 68 which provides interference with the swing arm 60 at both the stored and support positions of the swing arm 60 so that the operator may easily move the swing arm 60 between these positions.

Because a rear elongated side 101 of the swing arm 60 may be even or nearly even with the rear end of the vehicle 10 when the swing arm 60 is in its stored position, the tailgate 26 may come into contact with the swing arm 60 when the tailgate 26 is pivoted downwardly to a vertical position or beyond (past its open position where it may be supported by the swing arm 60). Therefore, it may be desirable to include a rubber pad 69 on the side 101 to absorb shock and reduce noise that would otherwise result from the tailgate 26 hitting the swing arm 60 (especially where both are metallic). In such a case it would be desirable to ensure that the distance the handle 66 extends from the swing arm 60 is less than the distance the latch section 27 extends from the upright panel 28 so that first contact between the tailgate 26 and the swing arm 60 will be made between the rubber pad 69 and the latch section 27 rather than the handle 66 and the upright panel 28.

A latch hook 70 is mounted at a distal end 72 of the swing arm 60 by a bolt 74, which serves as an axis of rotation for the hook 70. The latch hook 70 is welded to a bushing 71 which surrounds the bolt 74 so that the hook 70 is retained at its desired position on the bolt 74. Nylon washers 73 are provided at each end of the bushing 71 to provide friction necessary to load the bushing 71 to require a desired amount of force to rotate the hook 70. A handle 78 extends from the hook 70 so that an operator may more easily rotate the hook 70 to latch the tailgate 26 in its open position. A support bracket 75 is mounted to a cargo box frame rail 15 adjacent a proximal end 77 of the swing arm 60 when the swing arm 60 is in its support position (FIG. 5) to provide support for the proximal end 77 of the swing arm 60 in order to reduce the bending moment seen by the bolt 62 when the swing arm 60 is loaded at its distal end 72 by the tailgate 26.

Figure 7:
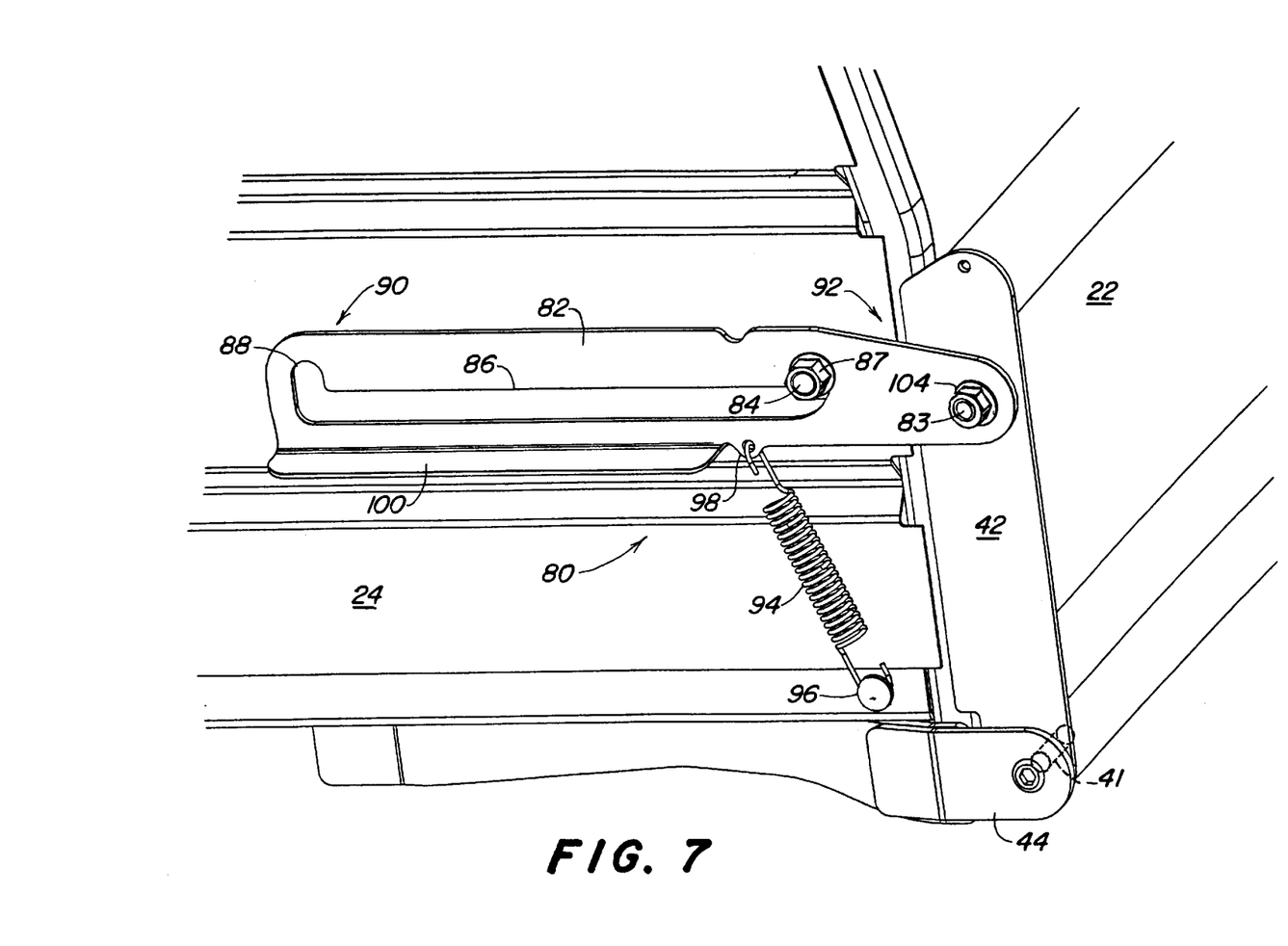
FIG. 7 is an enlarged partial left front perspective view of the cargo box of FIG. 1 showing a front latch retaining the sidewall in its closed, upright position.
Figure 8:
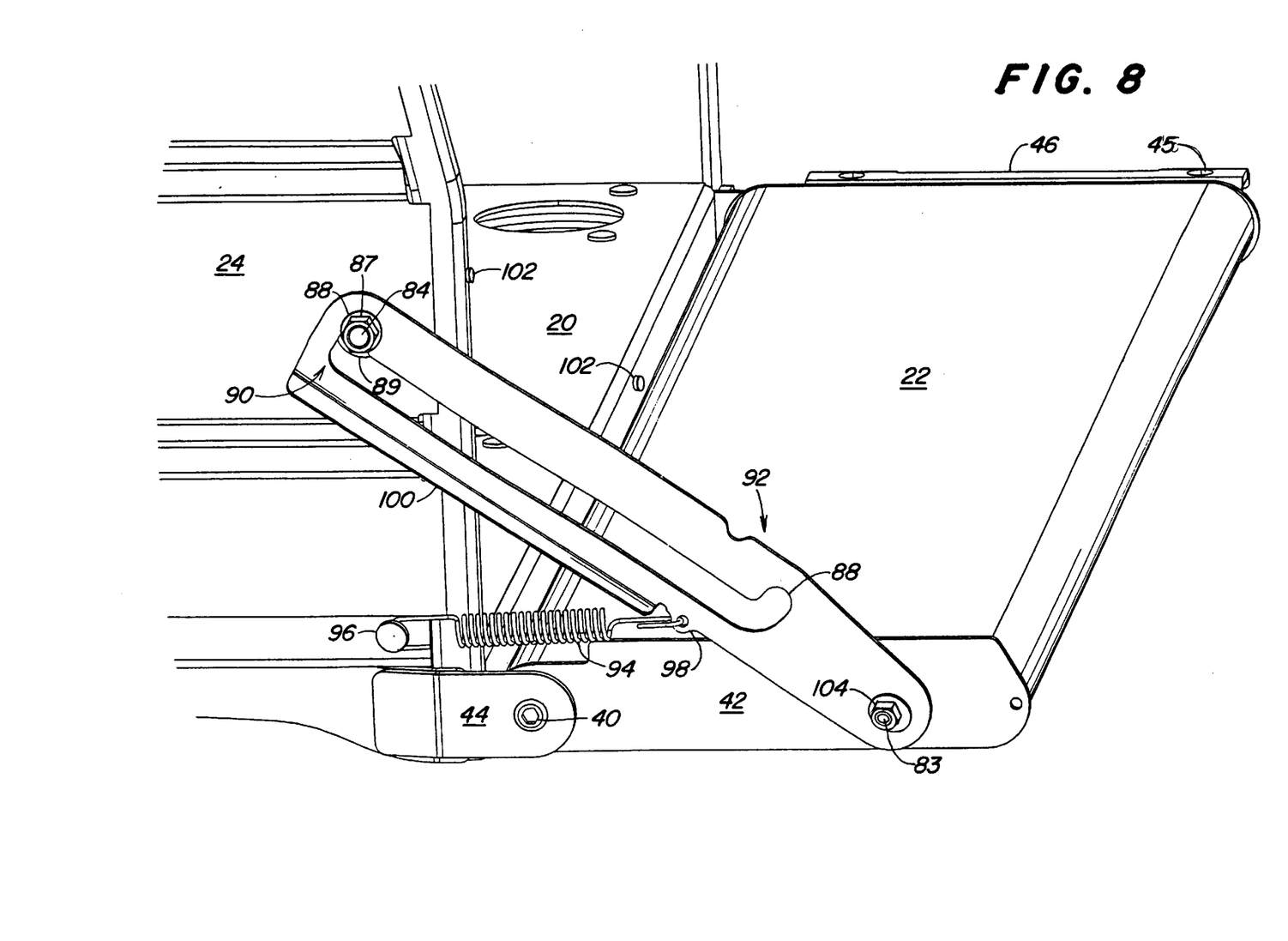
FIG. 8 is an enlarged partial left front perspective view of the cargo box of FIG. 7 showing the front latch retaining the sidewall in its open, recumbent position.

Looking now to FIGS. 7 and 8, it will be seen that the sidewalls 22 each have, at opposite front and rear ends, sidewall end plates 42 which include holes for receiving pivot pins 41 which are also received by sidewall mounting brackets 44 which are fixed with respect to the floor 20. The pivot pins 41 are retained in position as the pivot pins 40 used for the tailgate 26 by threaded engagement with welded nuts. The pivot pins 41 at each end of the sidewalls 22 similarly represent a pair of transversely spaced apart and generally horizontal axes about which the sidewalls 22 may pivot. The sidewall end plates 42 at the rear ends of the sidewalls 22 each include a retaining flange 46 welded thereto. As seen in FIG. 2, the retaining flange 46 includes a main portion 47 which extends rearwardly from end plate 42 of the sidewall 22 and bent portions 48 extending rearwardly and outwardly from the main portion 47. The retaining flange is provided with a hole 45 for a purpose to be described.

Figure 4:
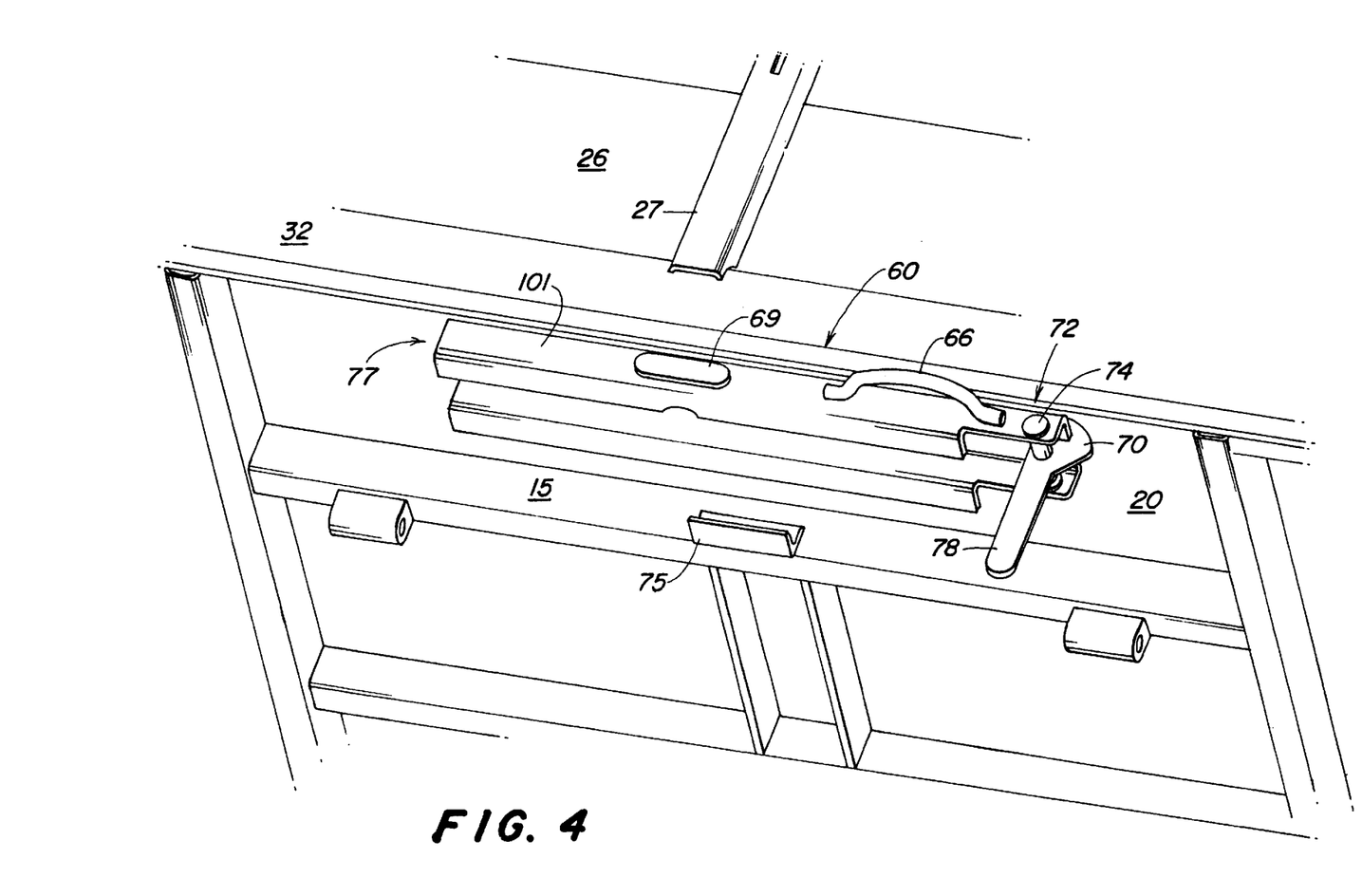
FIG. 4 is a bottom rear view of the cargo box of FIG. 2 showing a tailgate support arm in its stored position and the tailgate in its closed, upright position.
Figure 5:
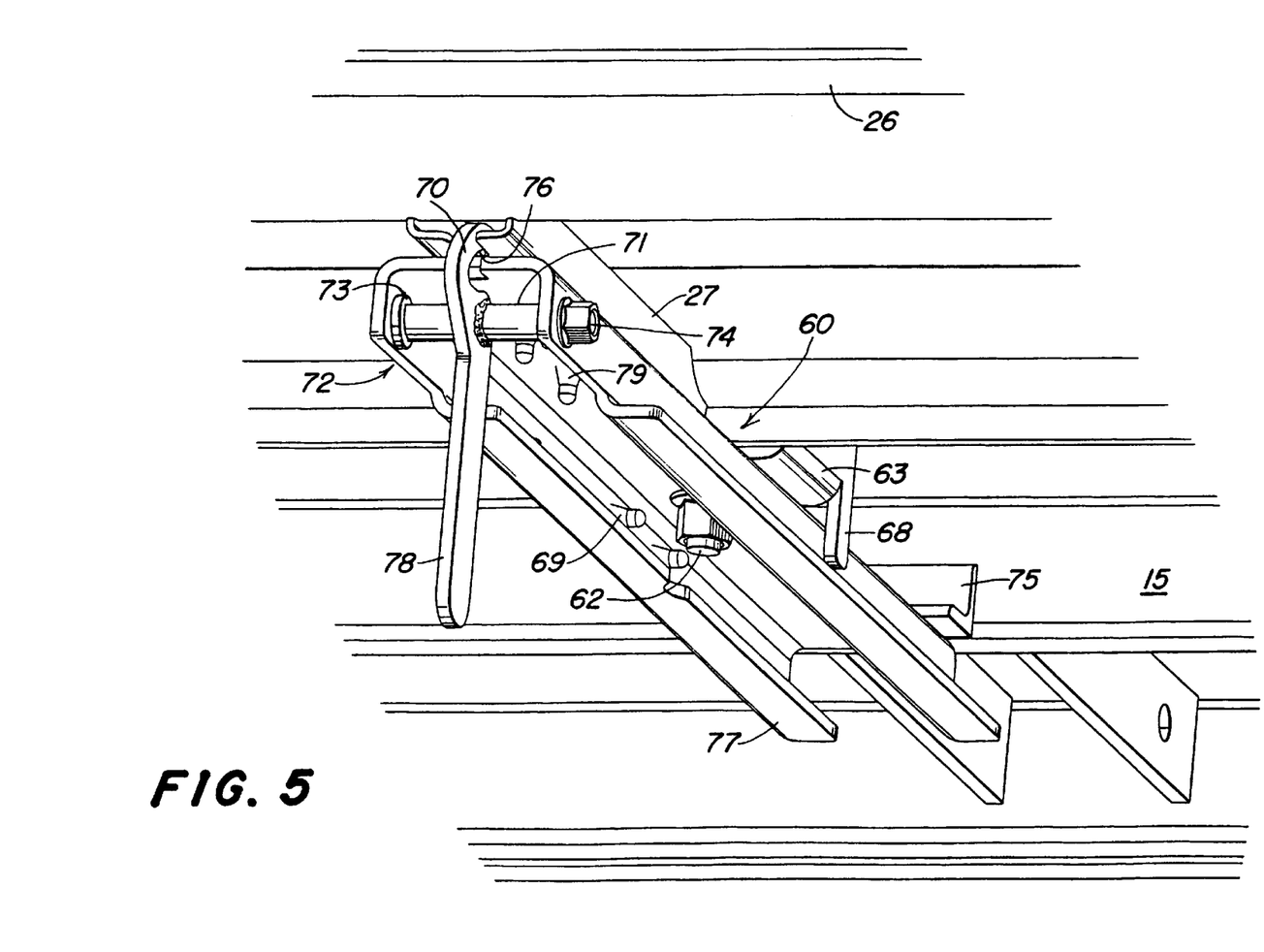
FIG. 5 is a worm's eye view of the cargo box of FIGS. 2 and 4 showing the tailgate support arm in its support position and latching the tailgate in its open, recumbent position.
Figure 6:
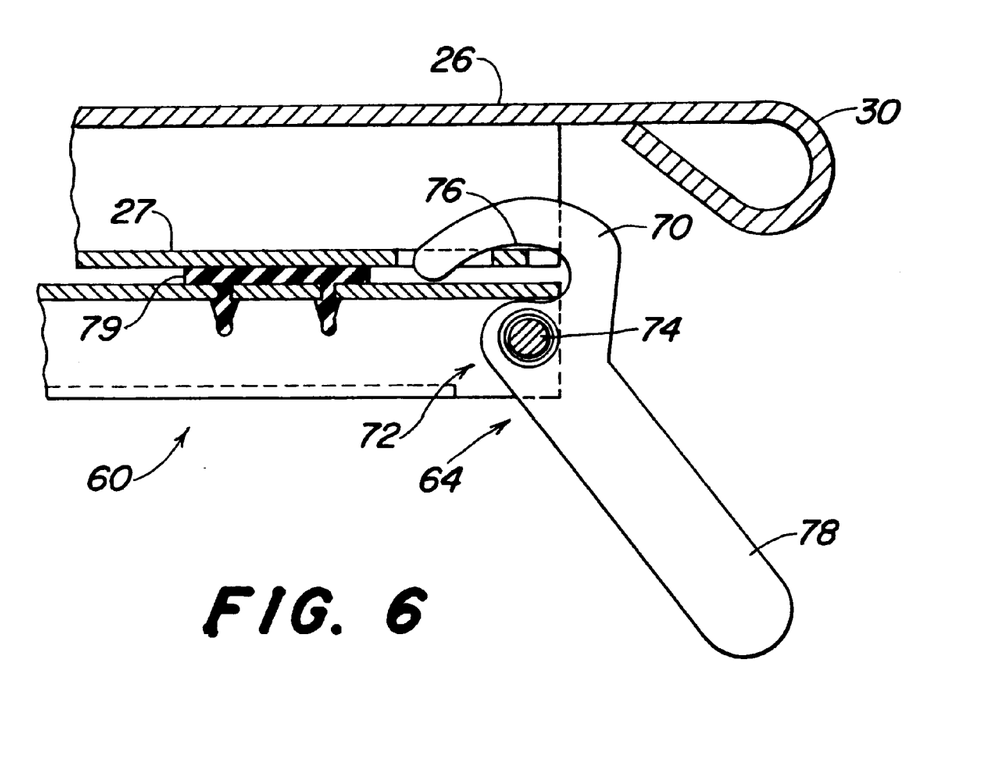
FIG. 6 is a cross-sectional view of a rear portion of the the tailgate support arm and tailgate of FIG. 5.

Referring now to FIGS. 2, 4, and 5, it will be seen that when it is desirable to open the tailgate 26 and to latch the tailgate 26 in its open position, the swing arm 60 is rotated from its stored position (FIG. 4) to its support position (FIG. 5) so that it extends rearwardly beyond the tailgate 26 as considered in its closed position. To release the latching structure 50, the L-shaped rods 52 may be slid inward (against the force of the spring) so that the ends of the rods 52 are removed from engagement with holes in the sidewall retaining flanges 46. The tailgate 26 may then be pivoted downwardly. Referring now to FIGS. 5-6, when the tailgate 26 achieves a generally horizontal orientation (its open position), the latch section 27 will be in abutting relationship with the top of the swing arm 60. It may therefore be seen that the latch section 27 represents the surface of the tailgate 26 which is directly supported on the swing arm 60. The latch section 27 extends from the upright panel 28 of the tailgate 26 to ensure that the tailgate 26 is aligned with the floor 20 to form an extension thereof when the tailgate 26 is in its open position and supported by the swing arm 60. The tailgate 26 may then be locked in its open position by movement of the handle 78, effecting rotation of the hook 70 into the open end of the latch section 27. The hook 70 then captures the bottom side of the latch section 27. An interior contour 76 of the hook 70 is not a constant radius about the bolt 74, so that the hook 70 acts as a cam, clamping the tailgate 26 (via its latch section 27) and the swing arm 60 together with increasing force as the hook 70 is rotated. To unlatch the hook, 70, it may be rotated through an opening in the latch section 27 and back against the top of the swing arm 60 (shown in FIG. 6). Preferably, a snubber 79, configured of a resilient material such as rubber, is provided between the latch section 27 and the swing arm 60 (shown here fixed to the top of the swing arm 60) to reduce vibration and help prevent rattling of the connection (representing noise and instability of the connection) between the tailgate 26 and the swing arm 60 while the vehicle 10 moves over uneven terrain.

To close the tailgate 26, the tailgate 26 is disengaged from the swing arm 60 by rotation of the hook 70. As seen in the right hand side of FIG. 2, the tailgate 26 can then be pivoted upwardly until the L-shaped rods 52 extending therefrom are in an abutting relationship with the bent portions 48 of the sidewall retaining flanges 46. Further movement of the tailgate 26 causes the rods 52 to be slid inwardly by the bent portions 48 of the sidewall retaining flanges 46 and to be resiliently loaded as the spring 56 is compressed. When the tailgate reaches its closed, upright position, the rods 52 are aligned with the corresponding holes 45 in the sides of the flanges 46. The L-shaped rods 52 are biased by the force of the spring 56, so that ends of the rods 52 are positioned in each of the holes 45 in the retaining flanges 46, preventing further pivoting movement of the tailgate 26. At the same time, an inward extension of the sidewall retaining tab 37 will trap the main portion 47 of the retaining flange 46 so that the sidewall 22 cannot pivot outwardly. Abutment of the interior of the sidewall 22 against the tailgate 26 and front wall 24, as well as a front latch assembly 80, prevent the sidewall 22 from pivoting inwardly. It may therefore be seen that when the sidewalls 22 and tailgate 26 are in their closed, upright positions, they engage each other for mutual support. When the tailgate 26 is closed, the swing arm 60 should be rotated into its stored position.

The sidewalls 22 are supported and held in their open and closed positions by a front latch assembly 80 at the front end of each sidewall 22 (See FIGS. 7–8). The front latch assembly 80 for the left-hand sidewall 22 is shown in FIGS. 7–8. The front latch assembly 80 for the right-hand sidewall 22 is a mirror image. The front latch assemblies 80 each include a latch plate 82 which is pivotably secured at one end to the sidewall end plate 42 by a bolt 83 and nut 104. The bolt 83 is surrounded by a bushing which allows force to be transmitted between the nut 104 and the sidewall end plate 42 so that a tight connection may be maintained without inhibiting pivotal movement of the latch plate 82 about the bolt 83. A bolt 84 is mounted through an opening in the front wall 24 (and a corresponding opening in a strengthening plate 85 shown in FIG. 2 to effectively increase the gauge of the front wall 24). The bolt 84 and a bushing surrounding the bolt 84 are captured in a slot 86 in the latch plate 82 by a flanged nut 87 so that the latch plate 82 may slide with respect to the bolt 84 and the bolt 84 effectively follows the slot. It may be desirable to provide the bolt 84 with one or more washers 89 to act as bearing surfaces for the latch plate 82. The washers 89 serve to space the latch plate 82 from the front wall 24 to keep the latch plate 82 generally parallel to the front wall 24, since the sidewall end plate 42 is preferably designed to overlap the front wall 24 to provide added strength to the cargo box 18 when the sidewalls 22 are in their closed, upright positions. The washers 89 may be constructed of a low friction material so that the relative sliding between the bolt 84 and the latch plate 82 will require less effort. The slot 86 includes upturned portions 88 at inboard and outboard ends 90, 92 of the slot 86 which serve as detents, each corresponding to one of the open and closed positions of the sidewall 22. Preferably, the openings in the front wall 24 and the strengthening plate 85 are oblong so that the bolt 84 may be adjusted account for manufacturing tolerances in associated parts. The bolt 84 may be loosened, the sidewall 22 brought up tight against the outside of the front wall 24, and the bolt 84 re-tightened. This adjustment assures that the closed, upright position of the sidewall 22 correlates to a desired relationship between the sidewall 22 and the front wall 24.

A spring 94 is connected between a spring post such as a rivet 96 shown fixed to the front wall 24 and a tab portion 98 of the latch plate 82. The spring 94 biases the latch plate 82 downwardly so that, absent countervailing force applied by an operator, the bolt 84 will be seated within one of the upturned portions 88 and the sidewall 22 will be retained in the open or closed position corresponding to the particular upturned portion 88 in which the bolt 84 is seated. The latch plate 82 is shown having an outturned lip 100 so that an operator may more easily grasp the latch plate 82 to lift the latch plate 82 against the bias of the spring 94.

FIG. 7 shows the front latch assembly 80 associated with the left-hand sidewall 22 of the vehicle 10 where the sidewall 22 is shown in its closed position. The bolt 84 is seated in the upturned portion 88 of the slot 86 at the outboard end 92 of the slot 86, preventing pivoting of the sidewall 22.

An operator may open the sidewall 22 (when the tailgate 26 is in its open position) by lifting the latch plate 82 to overcome the force of the spring 94 and disengage the bolt 84 from the upturned portion 88 so that the latch plate 82 may travel the length of its slot 86 as the sidewall 22 pivots downwardly. When the sidewall 22 reaches its open position (shown in FIG. 8), the bolt 84 encounters the inboard end 90 of the slot 86, where the force of the spring 94 again biases the plate 82 downward so that the bolt is 84 captured in the upturned portion 88 at the inboard end 90 of the slot 86.

The sidewall 22 may be closed by lifting the latch plate 82 to unseat the bolt 84 from the upturned portion 88 at the inboard end 90 of the slot 86. The sidewall 22 may then be pivoted upwardly until the sidewall 22 reaches its closed position, where the bolt 84 encounters the outboard end 92 of the slot 86. The spring 94 will then pull the latch plate 82 downward so that the bolt 84 is seated in the upturned portion 88 at the outboard end 92 of the slot 86.

To convert the cargo box 18 into a flat bed (FIG. 2), the swing arm is rotated to its support position and the tailgate is opened in the manner set forth above and latched in its open position to the swing arm. The front latch assemblies 80 may then be manipulated as previously described so that the sidewalls 22 may be pivoted to their open positions, thereby completing the conversion. The cargo box 18 may be re-formed by first closing the sidewalls 22 and then the tailgate 26 in the manner herein described. It may be desirable to provide buffers such as nylon pads 102 around the periphery of the floor 20 and between the sidewalls 22 and the tailgate 26 and the front wall 24. The pads 102 serve to reduce noise when the sidewalls 22 and tailgate 26 are in their closed, upright positions.

Although the invention is described with reference to an illustrative embodiment, it will be understood by those skilled in the art that the invention may be advantageous in the form described as modified for use in other applications. The present invention should not be limited by the above-described embodiments, but should be limited solely by the claims that follow.

We claim:

1. A tailgate support for a cargo box having a floor, opposite sidewalls and a rear wall with the rear wall being defined by a tailgate which is mounted for pivoting about a generally horizontal axis located adjacent the floor, between an upright closed position and a recumbent open position, said tailgate support comprising an arm mounted beneath the floor and movable between a stored position wherein the arm is disposed substantially beneath the floor and a support position wherein the arm extends beyond the floor in a direction of horizontal extension of the tailgate as considered when the tailgate is in its open position whereby the tailgate rests on said portion of the arm when the arm is in its support position and the tailgate is in its open position.

2. The tailgate support of claim 1 additionally comprising a latch plate secured to the tailgate and a cam pivotably attached to the arm and engageable with said latch plate for clamping the latch plate to the arm to latch the tailgate in its open position.

3. The tailgate support of claim 2 additionally comprising a resilient snubber disposed between the latch plate and the arm.

4. The tailgate support of claim 2 additionally comprising a handle operatively coupled to said cam for selectively moving said cam from engagement with said latch plate.

5. The tailgate support of claim 1 additionally comprising a support bracket mounted beneath the floor wherein the arm is engageable with the support bracket when the arm is in its support position.

6. The tailgate support of claim 1 additionally comprising a stop engageable with the arm for limiting pivoting of the arm past its support position.

7. The tailgate support of claim 1 additionally comprising a stop engageable with the arm for inhibiting pivoting of the swing arm past its stored position.

8. A tailgate support for a cargo box having a floor, opposite sidewalls and a rear wall with the latter being defined by a tailgate which is mounted for pivoting about a generally horizontal axis located adjacent the floor, between an upright closed position and a recumbent open position and the tailgate being releasably latchable in its closed position by a structure acting between each end of the tailgate and an adjacent one of the opposite sidewalls, said tailgate support comprising a swing arm mounted beneath the floor and pivotable between a stored position wherein the swing arm is disposed beneath the floor and a support position wherein the swing arm extends beyond the floor in a direction of horizontal extension of the tailgate as considered when the tailgate is in its open position whereby the tailgate rests on the swing arm when the swing arm is in its support position and the tailgate is in its open position.

9. The tailgate support of claim 8 wherein the structure acting between each end of the tailgate and an adjacent one of the opposite sidewalls includes a plurality of slidable rods mounted to the tailgate and a pair of flanges, one of said pair of flanges secured to one of the opposite sidewalls and the other of said pair of flanges secured to the other of the opposite sidewalls, each of said flanges having a hole corresponding in position to one of the slidable rods.

10. The tailgate support of claim 9 wherein the flanges include bent portions for guiding the slidable rods into engagement with the holes in the flanges.

11. A convertible cargo box for transporting cargo on a vehicle having a frame, said cargo box comprising:
a floor mounted on the frame;
first and second opposite sidewalls mounted adjacent the floor and extending perpendicular thereto;
a tailgate pivotably mounted about a generally horizontal axis located adjacent the second side of the floor; and
a tailgate support assembly for releasably supporting the tailgate in its open position, said tailgate support assembly comprising a swing arm mounted beneath the floor, said swing arm pivotable between a stored position wherein the swing arm is disposed beneath the floor and a support position wherein the swing arm extends beyond the floor in a direction of horizontal extension of the tailgate as considered when the tailgate is in its open position whereby the tailgate rests on the swing arm when the swing arm is in its support position and the tailgate is in its open position.

\* \* \* \* \*